(12) United States Patent
Szilagyi et al.

(10) Patent No.: US 9,057,845 B2
(45) Date of Patent: *Jun. 16, 2015

(54) MULTI-FERRULE OPTICAL FIBER CABLE ASSEMBLY

(71) Applicant: Molex Incorporated, Lisle, IL (US)

(72) Inventors: B. Daniel Szilagyi, Naperville, IL (US); Yuriy Belenkiy, Wheeling, IL (US)

(73) Assignee: Molex Incorporated, Lisle, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/730,959

(22) Filed: Dec. 29, 2012

(65) Prior Publication Data

US 2013/0209041 A1    Aug. 15, 2013

Related U.S. Application Data

(60) Provisional application No. 61/582,294, filed on Dec. 31, 2011.

(51) Int. Cl.
*G02B 6/36* (2006.01)
*B29D 11/00* (2006.01)
*G02B 6/38* (2006.01)

(52) U.S. Cl.
CPC *G02B 6/36* (2013.01); *B29D 11/00* (2013.01); *Y10T 29/49826* (2015.01); *G02B 6/38* (2013.01); *G02B 6/3801* (2013.01); *G02B 6/3883* (2013.01); *G02B 6/3807* (2013.01); *G02B 6/3825* (2013.01); *G02B 6/3847* (2013.01); *G02B 6/381* (2013.01); *B29D 11/0075* (2013.01); *G02B 6/3878* (2013.01); *G02B 6/3885* (2013.01); *G02B 6/3887* (2013.01)

(58) Field of Classification Search
CPC .......... G02B 6/36; G02B 6/38; G02B 6/3801; G02B 6/3807; G02B 6/3825; G02B 6/381; G02B 6/3887; G02B 6/3883; G02B 6/3847; G02B 6/3885
USPC .............................. 385/53–60, 69–72, 75–78
See application file for complete search history.

(56) References Cited

U.S. PATENT DOCUMENTS

| | | | |
|---|---|---|---|
| 5,506,922 A | 4/1996 | Grois et al. | |
| 6,206,579 B1 * | 3/2001 | Selfridge et al. | 385/60 |
| 6,264,374 B1 * | 7/2001 | Selfridge et al. | 385/78 |
| 6,422,760 B1 * | 7/2002 | Matasek et al. | 385/60 |
| 6,764,221 B1 * | 7/2004 | de Jong et al. | 385/55 |
| 7,001,081 B2 * | 2/2006 | Cox et al. | 385/86 |
| 7,546,018 B2 * | 6/2009 | Hendrickson et al. | 385/135 |
| 7,942,591 B2 * | 5/2011 | Hopkins et al. | 385/86 |
| 2004/0234209 A1 * | 11/2004 | Cox et al. | 385/86 |
| 2010/0254663 A1 * | 10/2010 | Hopkins et al. | 385/78 |

* cited by examiner

*Primary Examiner* — Ryan Lepisto
*Assistant Examiner* — Guy Anderson (57) ABSTRACT

An optical fiber cable assembly includes an optical fiber cable, an optical fiber connector, and a strain relief member. The optical fiber connector has a housing with at least two ferrules supporting a plurality of optical fibers of the cable. Each ferrule has at least two ribbons of optical fibers therein. The strain relief member has a flexible corrugated conduit. A method is also disclosed.

20 Claims, 10 Drawing Sheets

FIG. 8

MULTI-FERRULE OPTICAL FIBER CABLE ASSEMBLY

REFERENCE TO RELATED APPLICATIONS

The Present Disclosure claims priority to prior-filed U.S. Provisional Patent Application No. 61/582,294, entitled "Multi-Ferrule Optical Fiber Cable Assembly," filed on 31 Dec. 2011 with the United States Patent And Trademark Office. The content of the aforementioned patent application is incorporated in its entirety herein.

BACKGROUND OF THE PRESENT DISCLOSURE

The Present Disclosure relates generally to optical fiber cable assemblies and, more particularly, to a multi-ferrule optical fiber cable assembly.

It is often desirable to minimize the size of optical fiber cable assemblies. In some situations, the reduction in size complicates the manufacturing or assembly process. This is particularly true when manufacturing multi-ferrule optical fiber cable assemblies that have a plurality of optical fibers in one or more generally parallel rows or side-by-side arrays.

SUMMARY OF THE PRESENT DISCLOSURE

In one aspect, an optical fiber cable assembly includes an optical fiber cable, an optical fiber connector, and a strain relief member. The cable has a plurality of optical fibers and a jacket surrounding the optical fibers. Arrays of the optical fibers are interconnected to form a plurality of generally planar optical fiber ribbons. The optical fiber connector has a housing with a mating end, a rear end, and at least two ferrules. Each ferrule supports at least two of the generally planar optical fiber arrays therein. The strain relief has a flexible corrugated conduit connected to a rear end of the optical fiber connector and a portion of the optical fiber cable.

BRIEF DESCRIPTION OF THE FIGURES

The organization and manner of the structure and operation of the Present Disclosure, together with further objects and advantages thereof, may best be understood by reference to the following Detailed Description, taken in connection with the accompanying Figures, wherein like reference numerals identify like elements, and in which:

FIG. 6b is a diagrammatic end view of the terminated ferrule assemblies and flexible conduit of FIG. 6a;

FIG. 9a is a diagrammatic side view of the terminated ferrule assemblies of FIG. 6a prior to insertion of the assemblies through the flexible conduit but with the ferrule assemblies in an axially staggered stack;

FIG. 9b is a diagrammatic end view of the terminated ferrule assemblies and flexible conduit of FIG. 9a;

FIG. 10 is a diagrammatic side view of the axially staggered stack of ferrule assemblies of FIG. 9a partially inserted through the flexible conduit;

FIG. 11b is a diagrammatic end view of the terminated ferrule assemblies and flexible conduit of FIG. 11a;

DESCRIPTION OF THE PREFERRED EMBODIMENTS

While the Present Disclosure may be susceptible to embodiment in different forms, there is shown in the Figures, and will be described herein in detail, specific embodiments, with the understanding that the Present Disclosure is to be considered an exemplification of the principles of the Present Disclosure, and is not intended to limit the Present Disclosure to that as illustrated.

As such, references to a feature or aspect are intended to describe a feature or aspect of an example of the Present Disclosure, not to imply that every embodiment thereof must have the described feature or aspect. Furthermore, it should be noted that the description illustrates a number of features. While certain features have been combined together to illustrate potential system designs, those features may also be used in other combinations not expressly disclosed. Thus, the depicted combinations are not intended to be limiting, unless otherwise noted.

In the embodiments illustrated in the Figures, representations of directions such as up, down, left, right, front and rear, used for explaining the structure and movement of the various elements of the Present Disclosure, are not absolute, but relative. These representations are appropriate when the elements are in the position shown in the Figures. If the description of the position of the elements changes, however, these representations are to be changed accordingly.

Figure 1:
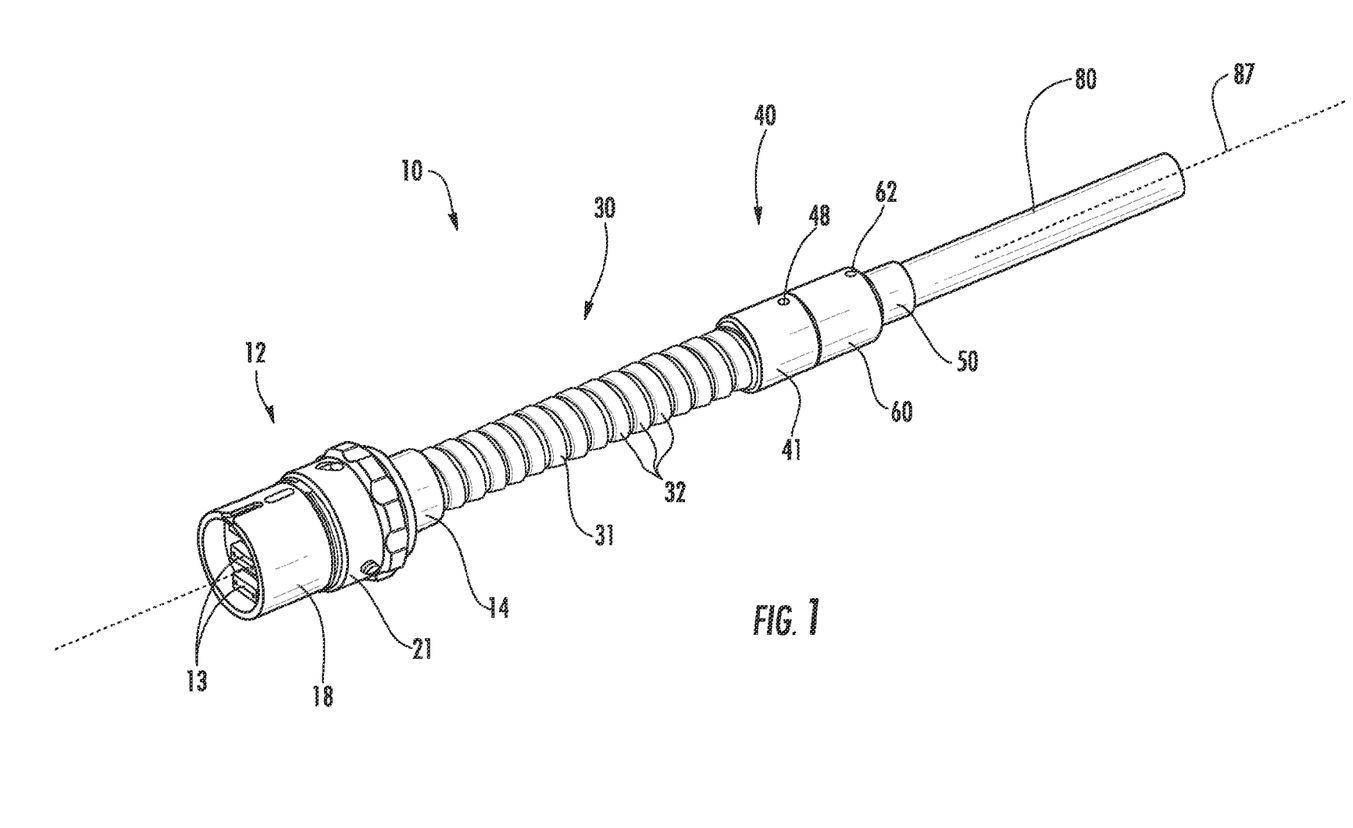
FIG. 1 is a perspective view of an embodiment of an optical fiber cable assembly according to the Present Disclosure.
Figure 2:
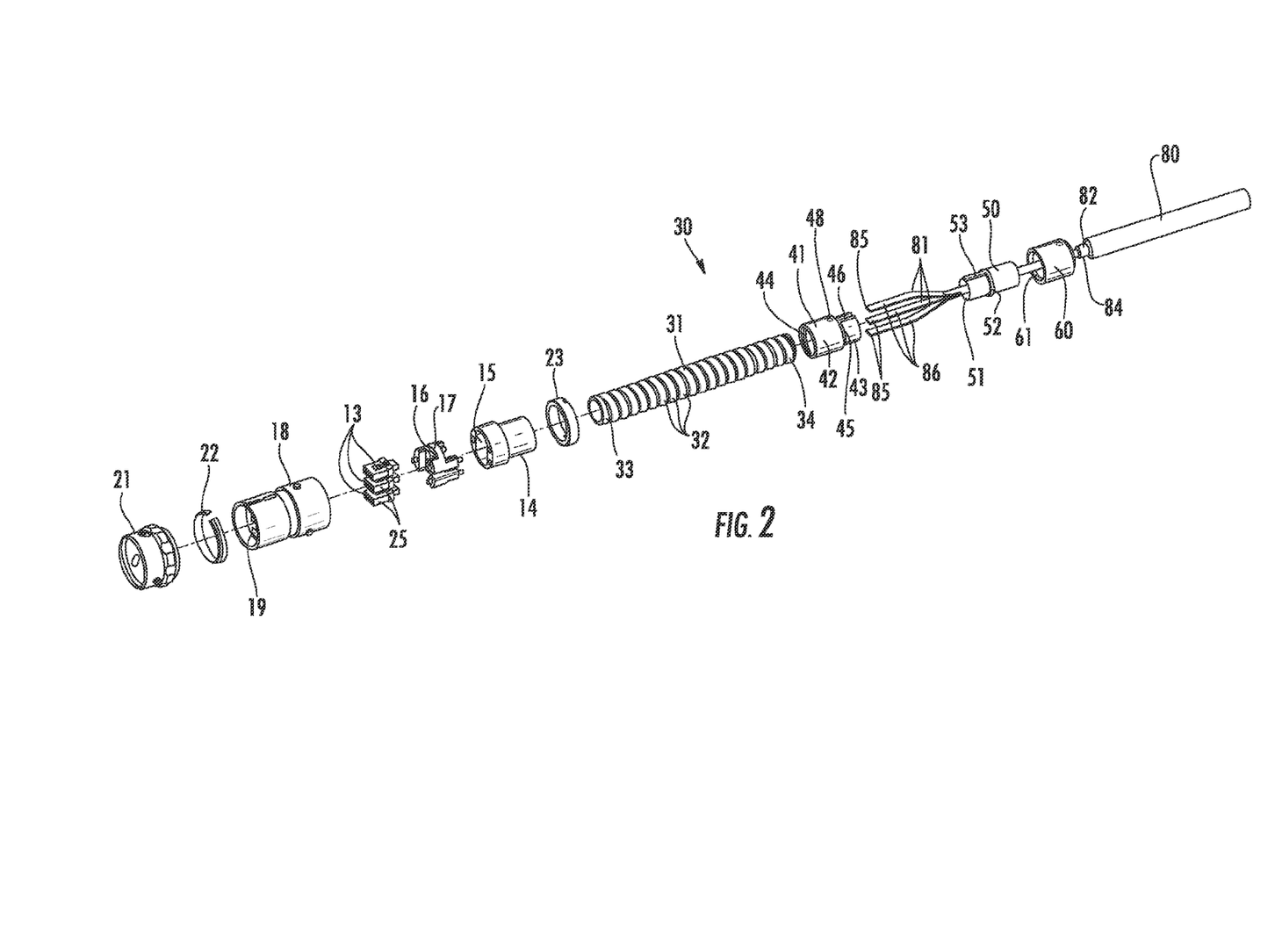
FIG. 2 is an exploded perspective view of the optical fiber cable assembly of FIG. 1.

Referring to FIGS. 1-2, an optical fiber cable assembly 10 is illustrated. Cable assembly 10 includes a connector assembly 12 which supports an array of multi-fiber ferrule assemblies 13. Each ferrule assembly 13 is terminated to the multi-fiber cable 80 having a plurality of optical fibers 81. Cable 80 has a plurality of individual loosely bundled optical fibers 81 within an inner flexible generally cylindrical jacket or sheath 82 that is surrounded by an outer flexible generally cylindrical jacket or sheath 83. A strength member 84 such as a plurality of strands of Kevlar® extend along the length of cable 80 between the inner jacket 82 and the outer jacket 83. As depicted, the individual optical fibers 81 and the inner jacket 82 are dimensioned so that the optical fibers may move to some extent within the inner jacket. During the process of manufacturing cable assembly 10, a termination end 85 of the optical fibers 81 may be secured together in one or more generally planar arrays or ribbons 86 and inserted into ferrule assembly 13. In an alternate embodiment, the cable 80 may have one or more pre-formed ribbon assemblies (not shown) of optical fibers that extend within the inner jacket 82.

Although depicted as a circular MT connector, connector assembly 12 may be any type of multi-ferrule optical connector. Connector assembly 12 has a plurality of components generally aligned along longitudinal axis 87 of cable 80. More specifically, a generally cylindrical rear housing component 14 has a central opening 15 therein and through which the terminated ferrule assemblies 13 pass. A ferrule support comb 16 is positioned axially between the ferrule assemblies 13 and the rear housing component 14 and along the longitudinal axis 87. The ferrule support comb 16 has a plurality of flexible arms 17 that engage a rear surface 29 of the ferrule assemblies 13 to bias the ferrule assemblies in a forward or mating direction. Front housing component 18 is generally cylindrical and has a plurality of rectangular openings 19 through which forward portions of the ferrule assemblies 13 extend. Front housing component 18 may include a rotatable latching collar 21 and a resilient split ring 22 that cooperate to provide a latching assembly for locking connector assembly 12 to a mating component (not shown).

Ferrule assemblies 13 are mounted on ferrule support comb 16 and positioned between rear housing component 14 and front housing component 18. A locking ring 23 may be secured to a rear portion of the front housing component 18 to capture and secure the rear housing component therebetween. Rear housing component 14, ferrule support comb 16, front housing component 18, rotatable latching collar 21, split ring 22 and locking ring 23 may be formed of any suitable material. In some embodiments, the rear housing component 14, front housing component 18, rotatable latching collar 21, and locking ring 23 may be formed of metal such as stainless steel. In some embodiments, the ferrule support comb 16 may be formed of a resin capable of being molded.

Figure 8:
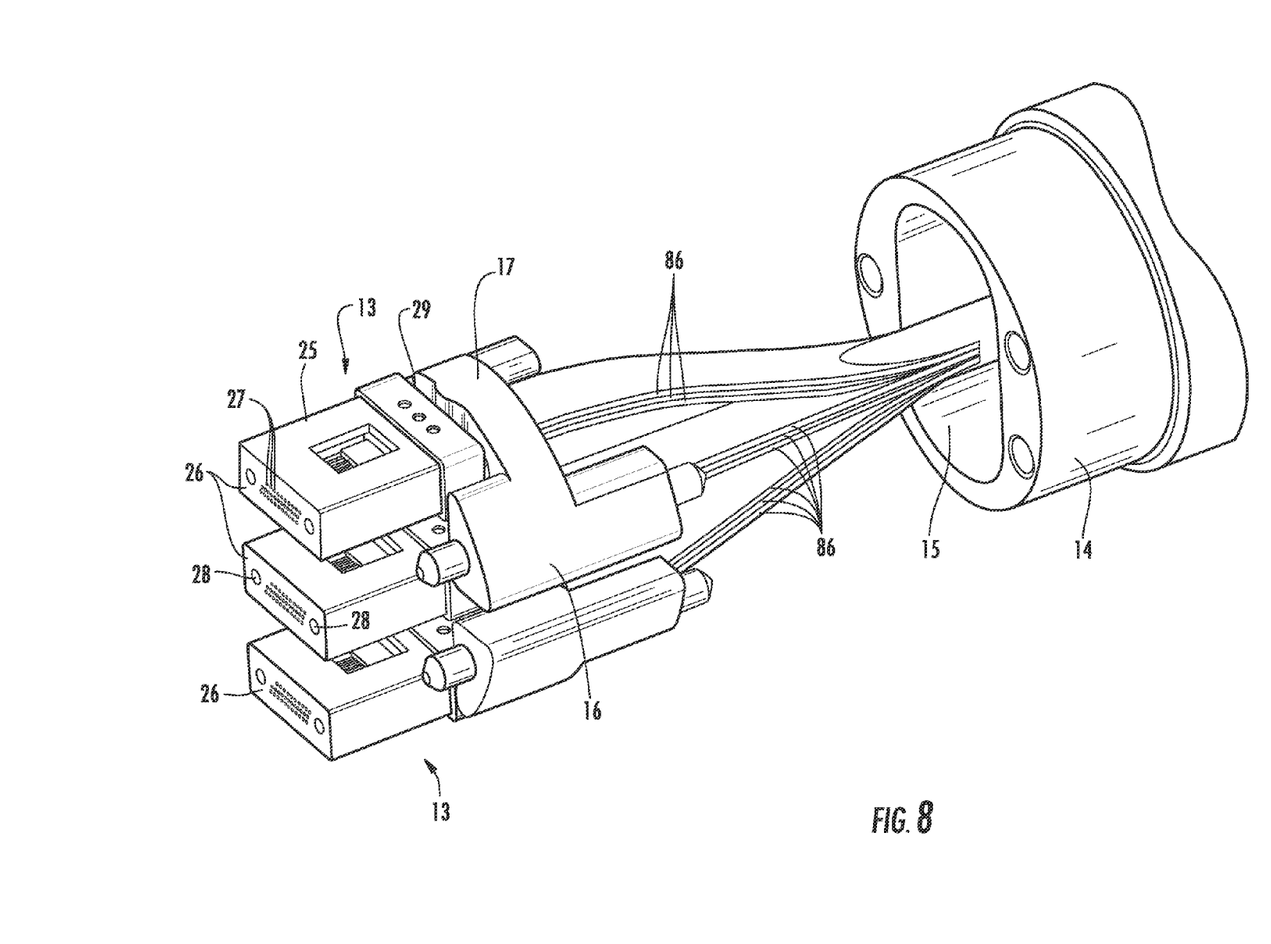
FIG. 8 is an enlarged perspective view of a portion of FIG. 7.

As best seen in FIG. 8, each ferrule assembly 13 includes a generally rectangular ferrule 25 with a generally flat front face 26. Each ferrule 25 may include one or more rows of generally cylindrical optical fiber receiving holes or bores 27 that extend through the ferrule 25 to the front face 26. Ferrule 25 may include a pair of alignment holes or receptacles 28 positioned on opposite sides of the array of fiber receiving holes 27. Ferrule 25 may be formed of a resin capable of being injection molded such as PPS or Ultem® and may include an additive such as silica (SiO2) to increase or improve the dimensional characteristics, strength and stability of the resin. One of the optical fibers 81 of multi-fiber cable 80 is positioned within each fiber receiving hole 27. The front face 26 of the ferrule 25 and the end faces of the optical fibers 81 adjacent the front face 26 are polished to a desired finish. Each ferrule assembly 13 may include more than one row of fiber receiving holes 27 and an array 86 of optical fibers 81 inserted in each row of holes. As described in greater detail below, as the number of arrays 86 of optical fibers 81 terminated to each ferrule assembly 13 increases, the flexibility of the assembly of arrays 86 of the optical fibers 81 decreases. This decrease in flexibility may increase the complexity of the assembly of the cable assembly 10.

Cable assembly 10 includes a strain relief assembly 30 for protecting the optical fibers 81 of cable 80. More specifically, strain relief assembly 30 includes a flexible conduit 31 and a cable mounting assembly 40 for securing the flexible conduit to the cable 80. Flexible conduit 31 may be a flexible corrugated conduit that includes a helically wound structure or tube with overlapping convolutions 32 that interlock with one another. The flexible conduit may be formed of metal or other materials. Other flexible conduit structures may also be used.

Figure 3:
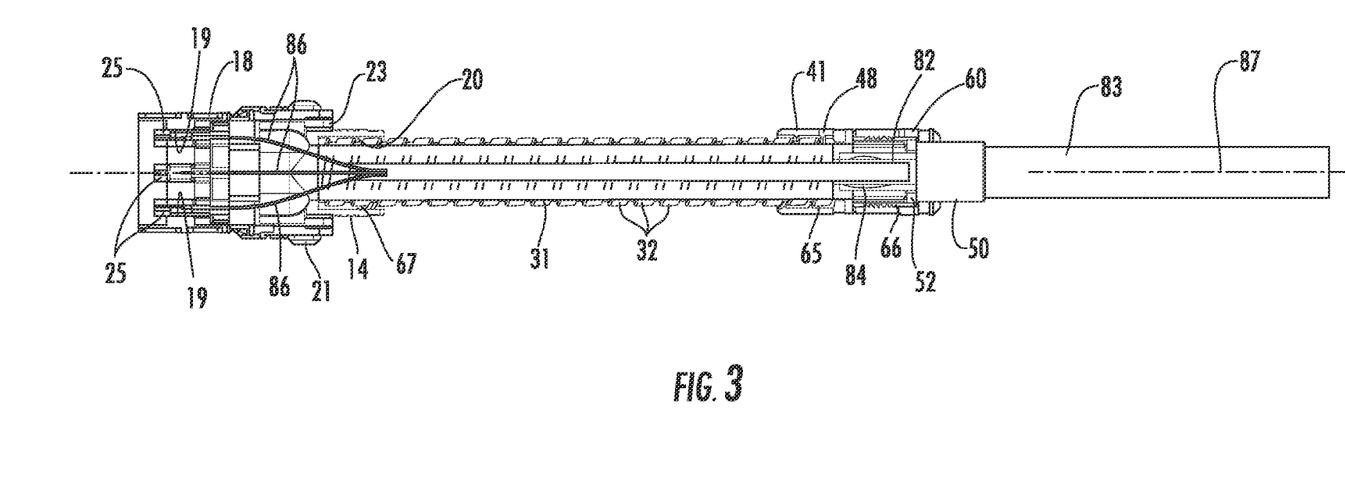
FIG. 3 is a section taken generally along Line 3-3 of FIG. 1.

Cable mounting assembly 40 acts as an adapter to secure a rear portion 34 of the flexible conduit 31 to the cable 80. Cable mounting assembly 40 has a rear mounting collar 41, a cable ferrule 50 and a rear cable mounting nut 60. Rear mounting collar 41 is generally cylindrical and has a forward section 42 and a rear section 43. Forward section 42 has a threaded inner diameter 44 and is dimensioned to threadingly receive the rear portion 34 of flexible conduit 31 therein. The rear section 43 has a threaded outer diameter 45 and is configured to threadingly engage threaded inner diameter 61 of rear cable mounting nut 60. A longitudinal slot 46 extends forward from a rear edge 47 of rear mounting collar 41 and interrupts or passes through threaded outer diameter 45. The forward section 42 may include one or more apertures 48 to permit the passage of an adhesive 65 (FIG. 3) such as epoxy through the apertures 48 and into contact with the rear portion 34 of flexible conduit 31 to secure the flexible conduit and the rear mounting collar 41 together.

The cable ferrule 50 is generally cylindrical and has an inner bore or diameter 51 dimensioned to receive outer jacket 83 of optical fiber cable 80 therethrough. An annular ring 52 projects from the cable ferrule 50 and may act as a shoulder between and against which both the rear mounting collar 41 and the rear cable mounting nut 60 engage. A longitudinal projection 53 extends along the outer surface of the cable ferrule 50 and is configured to be secured within longitudinal slot 46 of rear mounting collar 41 to prevent relative rotation between the rear mounting collar 41 and the cable ferrule 50. The cable ferrule 50 may be secured to the outer jacket 83 of optical fiber cable 80 through the used of an adhesive 62 (FIG. 3) such as epoxy. In some embodiments, other manners of securing the cable ferrule 50 to the outer jacket 83 may be used such as crimping.

Rear cable mounting nut 60 is generally cylindrical and has a threaded inner diameter 61 configured to engage the threaded outer diameter 45 of the rear section 43 of rear mounting collar 41. The rear cable mounting nut 60 may include one or more apertures 62 to permit the passage of an adhesive 66 (FIG. 3) such as epoxy through the apertures and into contact with the threads of the threaded outer diameter 45 of the rear section 43 of rear mounting collar 41 and the threaded inner diameter 61 of rear cable mounting nut 60 to secure the mounting collar and the nut together.

Each of the rear mounting collar 41, a cable ferrule 50 and a rear cable mounting nut 60 may be formed of any suitable material including a metal such as stainless steel. If the cable ferrule 50 is configured to be crimpable, the material chosen may be one that is readily deformable.

Rear housing component 14 secures a forward portion 33 of the flexible conduit 31 to the connector assembly 12. A rear section of rear housing component 14 may include a threaded inner diameter 20 (FIG. 3) configured to threadingly receive the forward portion 33 of flexible conduit 31 therein. An adhesive 67 (FIG. 3) such as epoxy may be inserted between the threaded inner diameter 20 and the forward portion 33 of flexible conduit 31 to secure the flexible conduit 31 to the rear housing component 14. In an alternate embodiment, a separate component (not shown) may be secured to the flexible conduit and the separate component then secured to the connector assembly 12.

Figure 4:
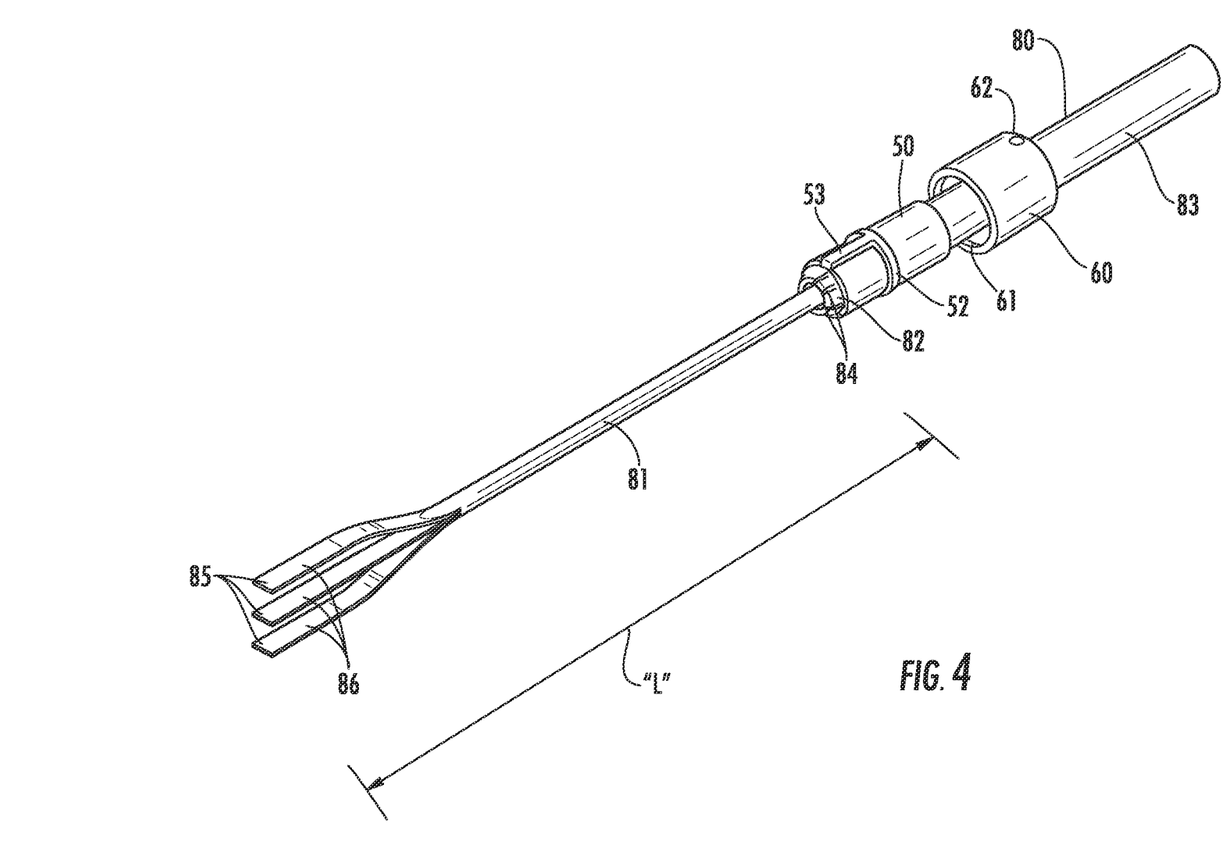
FIG. 4 is a perspective view of the optical fiber cable and certain components of the optical fiber cable assembly of FIG. 1.

Referring to FIGS. 4-12, processes for assembling the optical fiber cable assembly 10 are depicted. Referring to FIG. 4, the optical fiber cable 80 is prepared by removing a length of the inner jacket 82 and the outer jacket 83 so as to expose a length "L" of optical fibers 81 and a relatively short length of inner jacket 82 with a predetermined length of the strength member 84 (FIG. 3) exposed on top of the inner jacket. Groups or pluralities of the optical fibers 81 are secured together to create a plurality of planar arrays 86 of optical fibers. The planar arrays are configured as is known the art for subsequent insertion into the fiber receiving holes 27 in the ferrules 18. Cable ferrule 50 and rear cable housing nut 60 may then be slid onto the prepared cable 80. If desired, the cable ferrule 50 and rear cable housing nut may be slid onto cable 80 before the cable is prepared.

Figure 5:
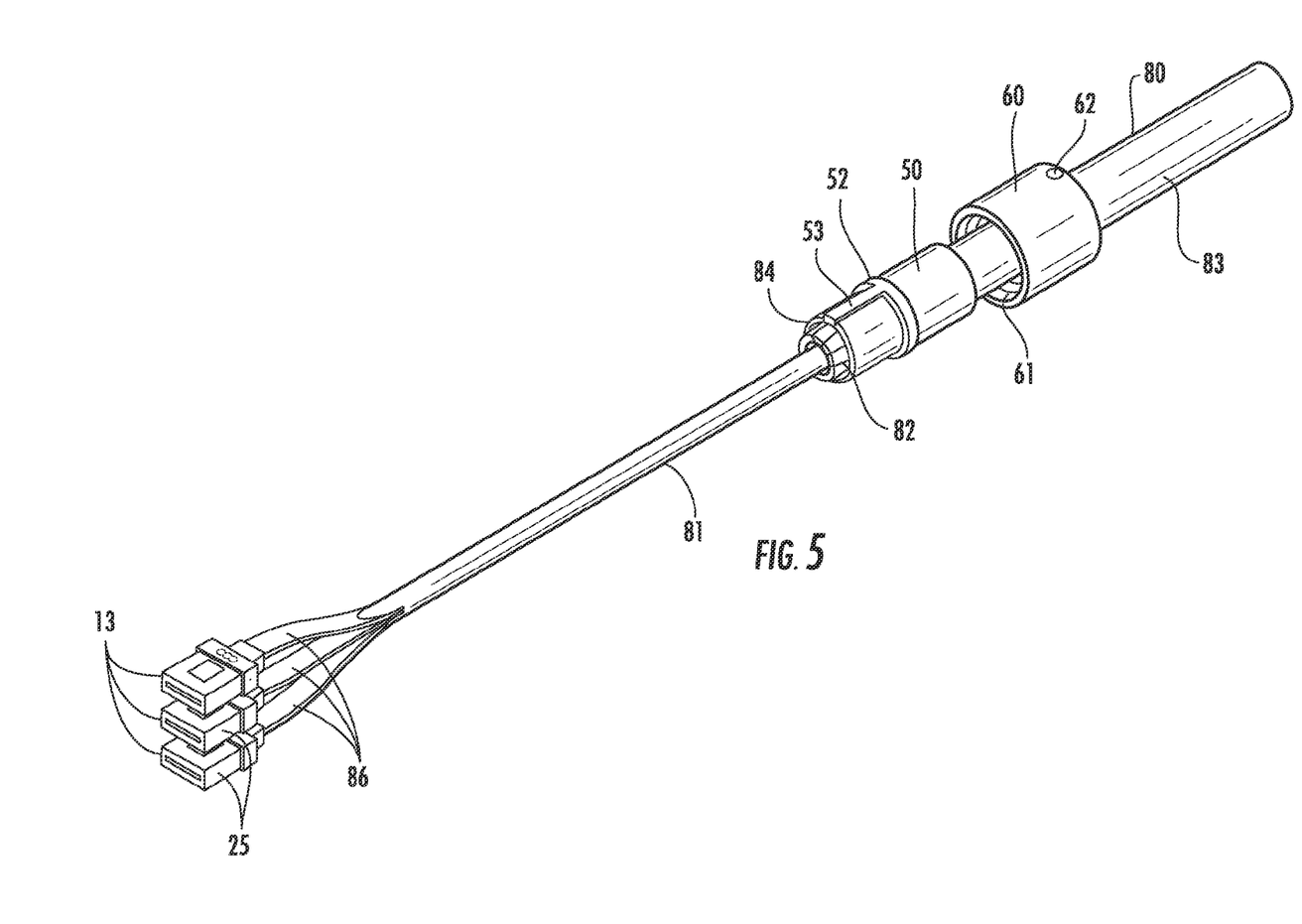
FIG. 5 is a perspective view of the optical fiber cable of FIG. 4 with a plurality of ferrule assemblies terminated to the optical fiber cable.

Referring to FIG. 5, the termination ends 85 of the optical fibers 81 are inserted into the ferrule assemblies 13 and terminated thereto in a known manner. The end faces of the optical fibers 81 adjacent the front face 26 of each ferrule 25 are polished to a desired finish. It should be noted that the length "L" of the optical fibers 81 may be established based upon the length required to prepare, terminate and polish the optical fibers. In general, the greater number of optical fibers 81 as well as the greater number arrays 86 of optical fibers to be inserted into the ferrule assemblies 13, the greater the required length of "L."

The rear mounting collar 41 may be mounted on the rear portion 34 of flexible conduit 31 by rotating the rear mounting collar 41 relative to flexible conduit 31 so that the rear portion 34 of the flexible conduit 31 threadingly engages the threaded inner diameter 44 of forward section 42 of rear mounting collar 41. An adhesive 61 (FIG. 3) such as epoxy may be inserted through apertures 48 and into engagement with the rear portion 34 of the flexible conduit 31 to secure the flexible conduit to the rear mounting collar 41.

Figure 6A:
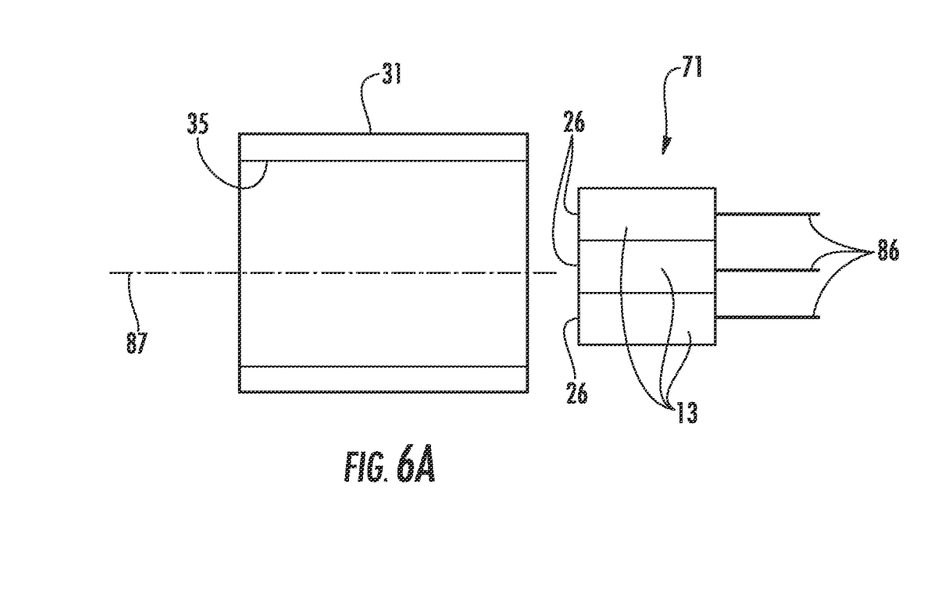
FIG. 6a is a diagrammatic side view of the terminated ferrule assemblies of FIG. 5 configured in an axially aligned stack prior to insertion of the assemblies through a flexible conduit of the optical fiber cable assembly of FIG. 1.
Figure 6B:
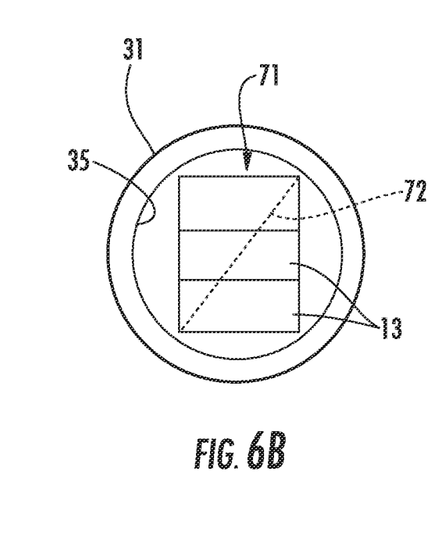
Figure 7:
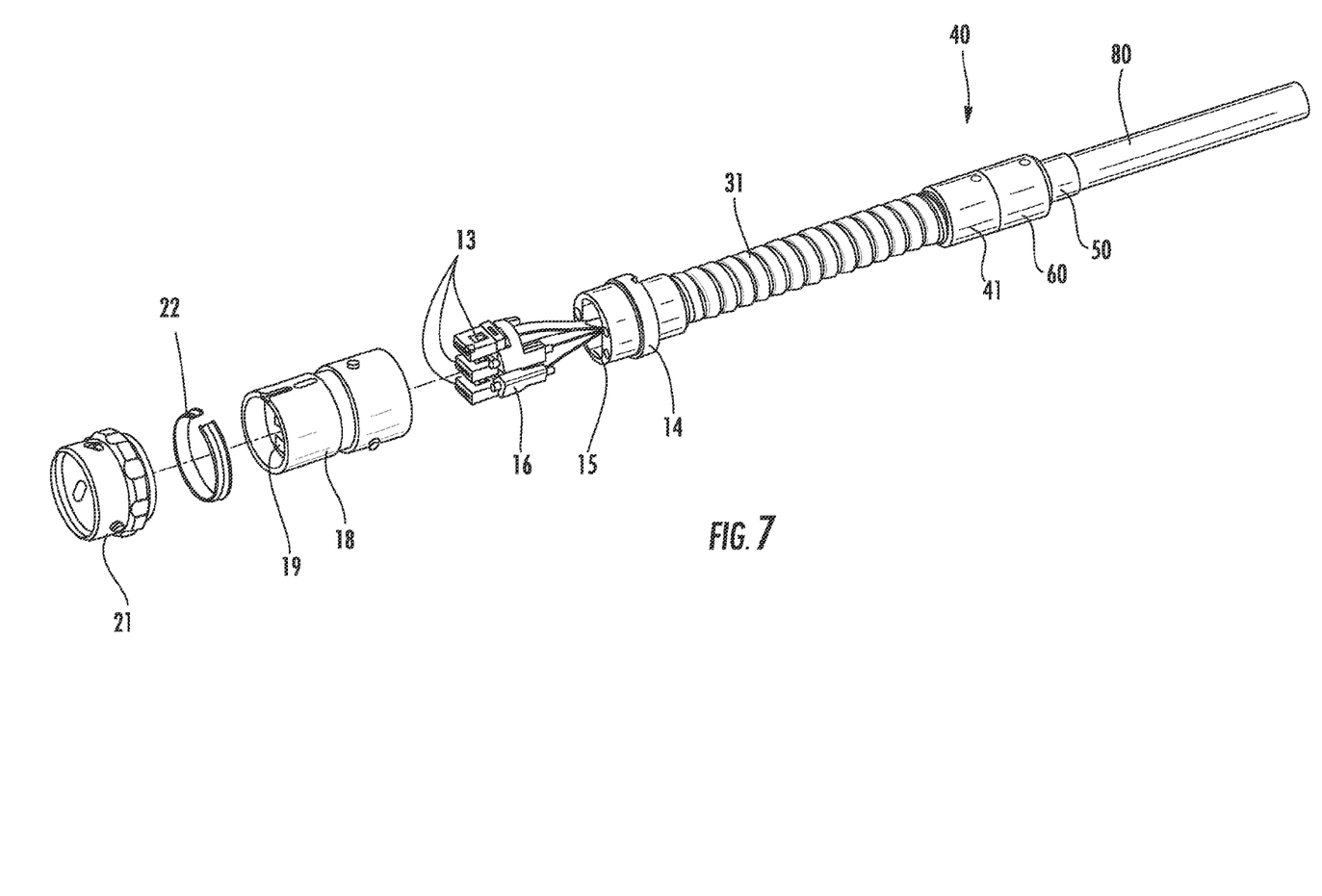
FIG. 7 is a partially exploded perspective view of the optical fiber cable assembly of FIG. 1 after the terminated ferrule assemblies have been inserted through the flexible conduit and mounted on a comb member.

Referring to FIGS. 6a-6b, diagrammatic views of the relationship between the terminated ferrule assemblies 13 and the flexible conduit 31 are depicted. A vertical stack 71 of ferrule assemblies 13 is depicted in which the ferrule assemblies are axially aligned along the longitudinal axis 87 of cable 80 and thus have their front faces 26 in a common vertical plane. As best seen in FIG. 6b, the bore or inner diameter 35 of the flexible conduit 81 must be larger than a diagonal line 72 across the vertical stack 71 to permit the vertical stack to pass through the flexible conduit.

Figures 9A, 9B, 10:
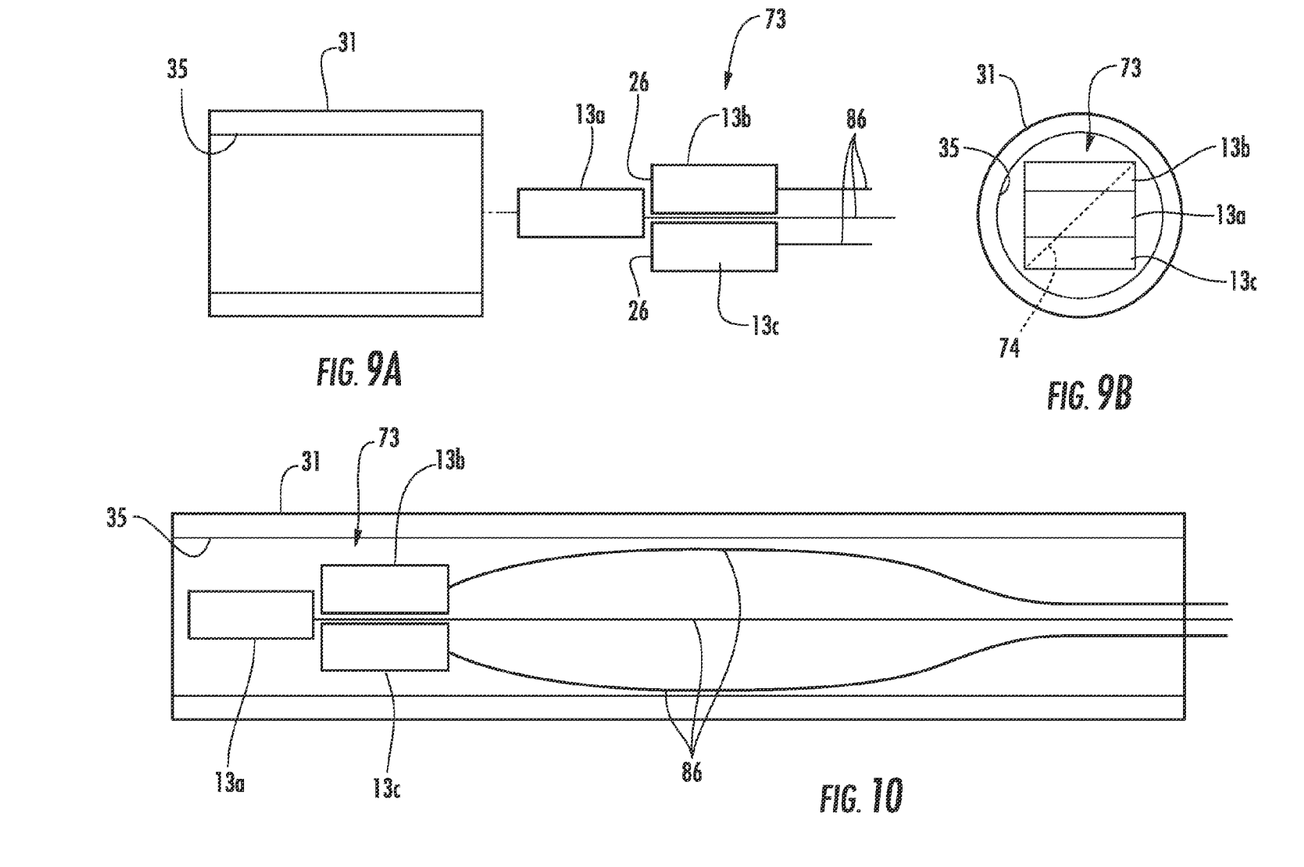

Referring to FIGS. 9a-9b, the ferrule assemblies 13 are arranged in a stacked array or compact stack 73 in which a first ferrule assembly 13a is axially or longitudinally staggered or positioned in front of (to the left in FIG. 9a) two other ferrule assemblies 13b-13c. The front faces 26 of the other ferrule assemblies 13b-13c may be axially aligned as depicted in FIG. 9a or axially staggered. The lower surface 31 of the upper ferrule assembly 13b and the upper surface 32 of the lower ferrule assembly 13c are positioned adjacent the optical fiber arrays 86 terminated to the first or leftmost ferrule assembly 13a to create a compact stack 73 or subassembly of ferrule assemblies.

By axially staggering the first ferrule assembly 13a from the rightmost ferrules assemblies 13b-13c, the optical fibers 81 extending from the rightmost ferrules assemblies 13b-13c will bow or curve vertically relative to longitudinal axis 87 of cable 80 as depicted in FIG. 10. As such, the compact stack 73 of ferrule assemblies 13 may pass through the inner diameter 35 of flexible conduit 31 provided that a diagonal line 74 across the compact stack 73 is sufficiently smaller than the inner diameter 35 and the curved optical fibers of the rightmost ferrule assemblies may also pass through the inner diameter.

In some embodiments, the ribbons of optical fibers 81 may have multiple bends or curves that allow them to pass through the flexible conduit 31. However, it should be noted that each ferrule assembly 13 may include more than one row of fiber receiving holes 27 and receive an array 86 of optical fibers 81 in each row of holes. As the number of arrays 86 of optical fibers 81 terminated to each ferrule assembly 13 increases, the flexibility of the ribbons of optical fibers typically decreases which may reduce the bending ability of the optical fibers 81 terminated to each ferrule assembly 13. This decrease in flexibility may increase the complexity of the assembly of the cable assembly 10.

Once the compact stack 73 of ferrule assemblies 13 has passed through flexible conduit 31 and rear mounting collar 41 (which is not shown in FIGS. 6. and 9-12 for simplicity), the compact stack 73 is inserted through rear housing component 14 and locking ring 23. The ferrule assemblies 13 and the arrays 86 of optical fibers 81 terminated to each ferrule 18 are mounted on ferrule support comb 16. The rear housing component 14 and forward housing component 18 are brought together with the ferrule assemblies 13 and the ferrule support comb 16 therebetween. The locking ring 23 is then secured to the forward housing component 18 to lock the forward and rear housing components together. The rotatable latching collar 21 and the split ring 22 may be mounted on the forward housing component 18 before or after the two housing components are assembled.

Figure 11A:
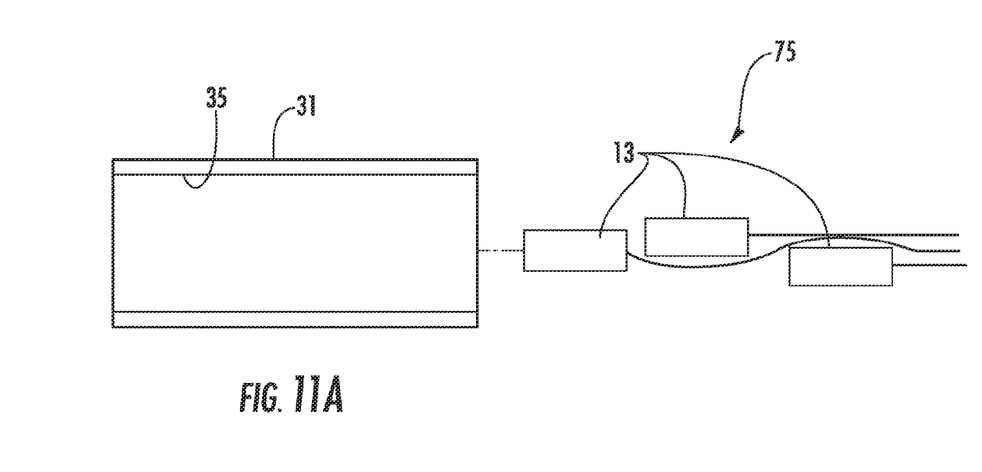
FIG. 11a is a diagrammatic side view similar to FIG. 9a of an alternate embodiment of an axially staggered array of terminated ferrule assemblies prior to insertion of the assemblies through the flexible conduit.
Figure 11B:
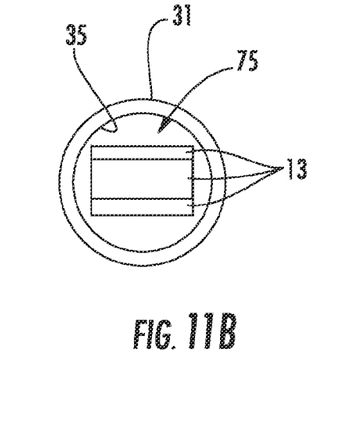

Referring to FIGS. 11a-11b, another alternate embodiment of an array 75 of ferrule assemblies 13 is depicted. The ferrule assemblies 13 are axially staggered and with the first ferrule assembly to the left generally positioned along the longitudinal axis 87 of cable 80. Subsequent ferrule assemblies alternate being positioned slightly above and slightly below the longitudinal axis 87. This configuration is similar to that of FIGS. 9a-9b but the ribbons 86 of the central ferrule assembly 13 curves or bows along the longitudinal axis to allow the subsequent ferrule assemblies to be closer to or more in-line with the longitudinal axis 87.

Figure 12A:
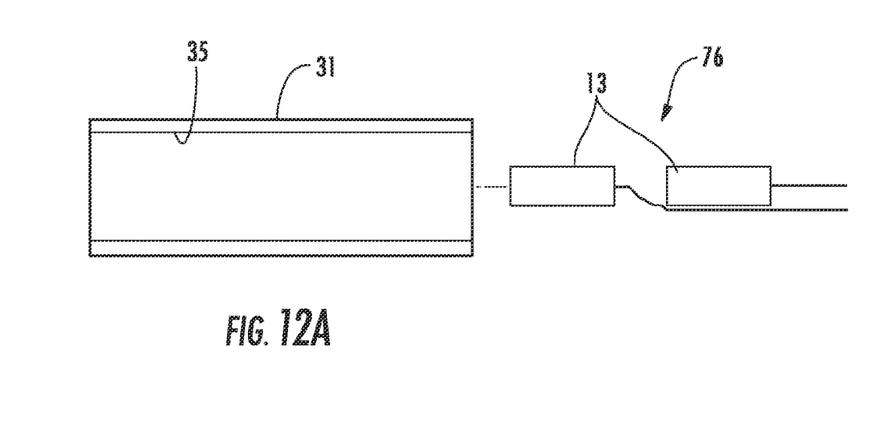
FIG. 12a is a diagrammatic side view similar to FIG. 9a of another alternate embodiment of an axially staggered array of terminated ferrule assemblies prior to insertion of the assemblies through the flexible conduit.
Figure 12B:
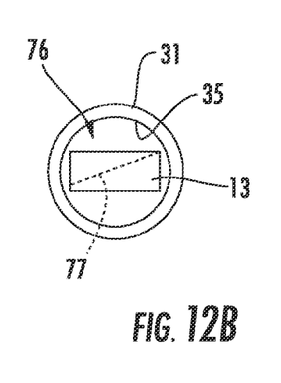
FIG. 12b is a diagrammatic end view of the terminated ferrule assemblies and flexible conduit of FIG. 12b.

Referring to FIGS. 12a-12b, an alternate embodiment of an array 76 of ferrule assemblies 13 is depicted. The ferrule assemblies 13 are axially staggered and generally positioned along the longitudinal axis 87 of cable 80. In such case, the inner diameter 35 of the flexible conduit 31 may be minimized and may be only slightly greater than a diagonal line 77 across the ferrule assembly 13. Although only two ferrule assemblies 13 are depicted, more than two may be positioned along the longitudinal axis 87 as part of the array 75.

By way of example and for comparison purposes, referring to FIG. 6b, ferrule 25 may be seen to have a width and a height defining a generally rectangular mating profile. For a ferrule 25 having a width of approximately 7 mm and a height of approximately 3 mm, the inner diameter 35 of conduit 31 may be at least approximately 12 mm. For the configuration of FIGS. 9a-9b with the same size ferrule 25, the inner diameter 35 of conduit 31 may be at least approximately 10.5 mm. For the configuration of FIGS. 11a-11b with the same size ferrule 25, the inner diameter 35 of conduit 31 may be at least approximately 10 mm. For the configuration of FIGS. 12a-12b with the same size ferrule 25, the inner diameter 35 of conduit 31 may be at least approximately 8.5 mm. In practice, it may be necessary to increase the size of the inner diameter 35 over those stated above to improve the assembly process.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

While a preferred embodiment of the Present Disclosure is shown and described, it is envisioned that those skilled in the art may devise various modifications without departing from the spirit and scope of the foregoing Description and the appended Claims.

What is claimed is:

1. An optical fiber cable assembly, the optical fiber cable assembly comprising:
    an optical fiber cable, the cable including a plurality of optical fibers and a jacket, the jacket surrounding the optical fibers, arrays of the optical fibers being interconnected to form a plurality of generally planar optical fiber ribbons;
    an optical fiber connector, the connector including a housing, a rear end, at least two ferrules, a first mounting adapter and a second mounting adapter, the housing including a mating end, each ferrule supporting at least two of the optical fiber arrays therein; and
    a strain relief member including a flexible corrugated conduit, the conduit being connected to a rear end of the connector and a portion of the cable;
    wherein the second mounting adapter includes a first portion, a second portion and a third portion, the first portion being connected to the flexible corrugated conduit, the second portion being connected to the cable, the third portion securing the first portion to the second portion.

2. The optical fiber cable assembly of claim 1, wherein:
    each ferrule has a generally rectangular mating profile, the profile being defined by a width and a height; and
    the flexible corrugated conduit has a generally uniform diameter, the diameter being smaller than a diagonal line extending between opposite corners of a mating profile of a stacked array of the ferrules.

3. The optical fiber cable assembly of claim 1, wherein each ferrule includes first and second sets of openings, optical fibers being positioned therein, the first and second sets being generally parallel and spaced apart.

4. The optical fiber cable assembly of claim 1, wherein the first mounting adapter is connected to the optical fiber connector, the second mounting adapter is connected to the optical fiber cable, and the first and second mounting adapters are connected to the flexible corrugated conduit.

5. The optical fiber cable assembly of claim 4, wherein at least one of the mounting adapters includes a threaded section, the threaded section engaging the flexible corrugated conduit.

6. The optical fiber cable assembly of claim 4, wherein the cable further includes a strength member, the strength member extending along a length of the cable, a section of the strength member being mechanically coupled to the flexible corrugated conduit through the second mounting adapter.

7. The optical fiber cable assembly of claim 6, wherein the section of the strength member is mechanically coupled to the flexible corrugated conduit with an adhesive.

8. A method of manufacturing an optical fiber cable assembly, the method comprising the steps of:
    providing an optical fiber cable having a longitudinal axis, the cable including a plurality of optical fibers and a jacket surrounding the optical fibers,
    stripping a portion of the jacket to expose a predetermined length of each optical fiber and defining a jacket end;
    providing a plurality of generally planar side-by-side arrays of the optical fibers, each array being interconnected to form a generally planar optical fiber ribbon;
    providing at least first and second ferrules, each ferrule receiving at least two optical fiber ribbons;
    securing at least two optical fiber ribbons to each ferrule to form a plurality of ferrule assemblies;
    positioning first and second ferrules assemblies with ferrule assemblies offset from each other along the longitudinal axis to define an array of ferrule assemblies;
    sliding the array of ferrule assemblies relative to the flexible corrugated conduit to move the flexible corrugated conduit along the exposed predetermined lengths of the optical fibers and towards the jacket end;
    providing an optical fiber connector;
    mounting first and second ferrules assemblies within the optical fiber connector, ends of the optical fibers of the first and second ferrule assemblies being generally aligned along a mating plane;
    securing a first end of the flexible corrugated conduit to the optical fiber connector; and
    securing a second end of the flexible corrugated conduit to the optical fiber cable.

9. The method of claim 8, wherein the mounting step includes positioning the end surfaces of the optical fibers of the first and second ferrules in a common plane.

10. The method of claim 9, wherein the mounting step further includes mounting the first and second ferrules within the optical fiber connector in a spaced apart configuration.

11. The method of claim 8, wherein the securing step includes securing the flexible corrugated conduit to the sheath of the cable.

12. The method of claim 8, further including the step of polishing end surfaces of the optical fibers of the optical fiber ribbons after the optical fibers are secured within each ferrule and before the flexible corrugated conduit is slid over the first and second ferrules.

13. The method of claim 8, wherein the plurality of optical fibers are loosely positioned within the jacket.

14. The method of claim 8, further including the step of providing a third ferrule, the third ferrule being configured to receive at least two of the optical fiber ribbons.

15. The method of claim 14, further including the step of aligning the third ferrule with one of the first and second ferrules along the mating axis while the first and second ferrules are in the ferrule assembly position.

16. The method of claim 14, further including the step of positioning the third ferrule adjacent to and offset from the first and second ferrules along the mating axis while the first and second ferrules are in the ferrule assembly position.

17. The method of claim 8, wherein the optical fiber cable further includes a strength member extending along a length thereof.

18. The method of claim 17, further including the step of mechanically coupling a section of the strength member to the flexible corrugated conduit.

19. The method of claim 13, further including the step of arranging the optical fibers in the generally planar side-by-side arrays and interconnecting the optical fibers of each array to form the plurality of optical fiber ribbons.

20. The method of claim 18, further including the step of applying an adhesive to mechanically couple the section of the strength member to the flexible corrugated conduit.

* * * * *